(12) United States Patent
Viuf (10) Patent No.: US 9,604,350 B2
(45) Date of Patent: Mar. 28, 2017

(54) POWER TOOL ADAPTOR AND A REVERSIBLE TOOL BIT HOLDER ADAPTOR FOR A POWER TOOL ADAPTOR

(75) Inventor: Erling Viuf, Føvling (DK)

(73) Assignee: FOVLING TRAEBYG APS, Fovling (DK)

( * ) Notice: Subject to any disclaimer, the term of this patent is extended or adjusted under 35 U.S.C. 154(b) by 302 days.

(21) Appl. No.: 14/008,082

(22) PCT Filed: Mar. 29, 2011

(86) PCT No.: PCT/DK2011/050101
§ 371 (c)(1),
(2), (4) Date: Sep. 27, 2013

(87) PCT Pub. No.: WO2012/130236
PCT Pub. Date: Oct. 4, 2012

(65) Prior Publication Data
US 2014/0015205 A1    Jan. 16, 2014

(51) Int. Cl.
*B23B 31/107* (2006.01)
*B23B 23/00* (2006.01)
(Continued)

(52) U.S. Cl.
CPC ........ *B25B 23/0035* (2013.01); *B25B 15/001* (2013.01); *B25B 21/007* (2013.01);
(Continued)

(58) Field of Classification Search
CPC .............. B23B 31/028; B23B 31/1071; B23B 31/1074; B23B 31/1177; B23B 31/28;
(Continued)

(56) References Cited

U.S. PATENT DOCUMENTS 2,806,706 A * 9/1957 Fitch ................... B25B 23/0035
200/83 P
3,023,015 A * 2/1962 Pankow ................. B23B 31/02
279/14
(Continued)

FOREIGN PATENT DOCUMENTS

WO    9415755 A1    7/1994
WO    0164400 A1    9/2001
(Continued)

OTHER PUBLICATIONS

International Search Report for corresponding application PCT/DK2011/050101 filed Mar. 29, 2011; Mail date Nov. 24, 2011.
(Continued)

*Primary Examiner* — Eric A Gates
*Assistant Examiner* — Chwen-Wei Su
(74) *Attorney, Agent, or Firm* — Cantor Colburn LLP (57) ABSTRACT

A power tool adaptor for holding a tool adapted thereto including an adaptor body, a tool insertion cavity formed in an end of the adaptor body for receiving the tool, an elongated tool bit insertion cavity formed as a continuation of the tool insertion cavity, means for fixating the tool by protruding into one or more fixation recesses on the outer surface of the tool and means for attaching the power tool adaptor to a power tool; a reversible tool bit holder is further disclosed for holding two changeable tool bits, which reversible tool bit holder is adapted to fit into the power tool adaptor, along with a kit including a power tool adaptor and a reversible tool bit holder adapted to fit into the power tool adaptor.

25 Claims, 5 Drawing Sheets

(51) Int. Cl.
- *B25B 23/00* (2006.01)
- *B25B 15/00* (2006.01)
- *B25B 21/00* (2006.01)
- *B23B 31/28* (2006.01)

(52) U.S. Cl.
CPC ....... *B23B 31/1071* (2013.01); *B23B 31/1074* (2013.01); *B23B 31/28* (2013.01); *B23B 2231/04* (2013.01); *Y10S 279/904* (2013.01); *Y10T 279/17* (2015.01); *Y10T 279/17411* (2015.01); *Y10T 279/23* (2015.01); *Y10T 279/3406* (2015.01); *Y10T 279/3412* (2015.01); *Y10T 279/3487* (2015.01)

(58) Field of Classification Search
CPC ........ B23B 2231/0232; B23B 2231/04; B25B 23/0035; Y10T 279/3406; Y10T 279/17786; Y10T 279/17811; Y10T 279/23; Y10T 279/29; Y10T 279/3412; Y10T 279/3487; Y10T 279/17008; Y10S 279/904; Y10S 279/905
USPC ... 279/143, 79, 82, 128, 137, 144, 156, 904, 279/905
See application file for complete search history.

(56) References Cited

U.S. PATENT DOCUMENTS

| | | | |
|---|---|---|---|
| 4,573,839 A | 3/1986 | Finnegan | |
| 5,032,043 A * | 7/1991 | Hollifield | B23B 31/208 279/155 |
| 5,954,463 A * | 9/1999 | Jore | B23B 31/1071 408/239 R |
| 6,241,434 B1 * | 6/2001 | Ajimi | B23B 31/005 279/75 |
| 6,347,914 B1 * | 2/2002 | Boyle | B23B 31/1074 408/226 |
| 6,488,452 B1 * | 12/2002 | Hoskins | B23B 31/1071 279/14 |
| 6,726,222 B2 * | 4/2004 | Rohm | B23B 31/1071 279/125 |
| 6,761,361 B2 * | 7/2004 | Taylor | B25B 23/0035 279/14 |
| 6,877,937 B2 * | 4/2005 | Hsiao | B23B 31/02 279/14 |
| 7,290,470 B1 | 11/2007 | Peters | |
| 8,622,400 B2 * | 1/2014 | Lin | B25B 23/0035 279/14 |
| 8,720,909 B2 * | 5/2014 | Hu | B25B 15/001 279/128 |
| 2004/0111804 A1 * | 6/2004 | Fan-Chiang | B25B 15/001 7/165 |
| 2008/0121075 A1 * | 5/2008 | Meng | B25B 15/001 81/177.85 |
| 2009/0026718 A1 * | 1/2009 | Krondorfer | B23B 31/1071 279/30 |
| 2009/0174157 A1 * | 7/2009 | Chang | B25B 15/001 279/99 |
| 2010/0229693 A1 * | 9/2010 | Chen | B23B 31/1071 81/60 |
| 2012/0160064 A1 * | 6/2012 | Moss | B25B 23/12 81/125 |

FOREIGN PATENT DOCUMENTS

| | | |
|---|---|---|
| WO | 0214019 A2 | 2/2002 |
| WO | 2006058068 A2 | 6/2006 |

OTHER PUBLICATIONS

International Preliminary Report on Patentability for corresponding application PCT/DK2011/050101 filed Mar. 29, 2011; Report date Oct. 1, 2013.

* cited by examiner

POWER TOOL ADAPTOR AND A REVERSIBLE TOOL BIT HOLDER ADAPTOR FOR A POWER TOOL ADAPTOR

FIELD OF THE INVENTION

The present invention relates to a power tool adaptor for attaching a tool to a power tool and a reversible tool bit holder adapted for fitting into said power tool adaptor.

BACKGROUND OF THE INVENTION

During construction and maintenance work on buildings and the like, the workers often need to use alternately two different pieces of tool, such as a drill and a screwdriver or two different kinds or sizes of screwdrivers.

When using drill bits and screwdriver bits driven by a power tool, it may be quite time-consuming to switch between the different tool bits because the previously used tool bit must be dismounted from the power tool, and the new tool bit must be located and mounted in the power tool.

A partly solution to this problem is provided in international patent application WO 02/14019 A2, in which is disclosed two-ended screwdriver bit with different screwdriver tips at the two ends, respectively. This solves the problem of locating the tool bit to be mounted in the power tool as it is already there, when the other end of the two-ended tool bit is being used. However, the tool bit still needs to be mounted in a drill chuck (see for instance FIG. 7), which must be opened and closed by rotation, which takes some time. Furthermore, a two-ended tool bit is needed for every combination of two tool types that may be relevant for the given work situation.

U.S. Pat. No. 7,290,470 B1 disclosed a better solution, in which the tool bits are changeable and the drill chuck does not need to be opened and closed to change the tip in use.

However, it is still rather cumbersome to reverse the reversible bit holder (reference 42) as the sleeve (ref 62) needs to be removed to do so.

The invention provides a solution, which is less space-consuming, more flexible and in which the mounting and dismounting of a tool, such as a reversible tool bit holder is easier and faster than in the examples known in the art.

BRIEF SUMMARY OF THE INVENTION

The present invention relates to a power tool adaptor for holding a tool, such as a reversible tool bit holder, adapted thereto, said adaptor comprising an adaptor body, a tool insertion cavity formed in a first end of the adaptor body for receiving the tool, an elongated tool bit insertion cavity formed as a continuation of the tool insertion cavity, means for releasably fixating the tool inserted in the tool insertion cavity at least in a longitudinal direction of the power tool adaptor, and means for attaching the power tool adaptor to a power tool, such as a power drill tool.

This configuration of the power tool adaptor enables it to hold a tool, such as a reversible tool bit holder, inserted in the tool insertion cavity with a tool bit, which is held by the reversible tool bit holder and points towards the power tool, being inserted in the tool bit insertion cavity of the power tool adaptor. In the simplest form, the tool may be mounted in the power tool adaptor by simply pushing it into the tool insertion cavity thereof, and it may be released from the power tool adaptor again by simply pulling it out of the tool insertion cavity. Furthermore, the configuration of the power tool adaptor allows it to hold a single tool bit inserted in the tool bit insertion cavity thereof through the tool insertion cavity.

It should be noted that the means for attaching the power tool adaptor to a power tool may comprise means for a releasable attachment, such as mounting in a common drill chuck or a quick-release lock, as well as means for more permanent attachments, like for instance the way a drill chuck is mounted on a common drilling machine.

In an embodiment of the invention, the tool insertion cavity is cylindrical.

A cylindrical tool insertion cavity is suitable for receiving a tool with a cylindrical body, which is advantageous because most rotating tools to be used with a power tool have cylindrical bodies so that they can be steadily supported and controlled during rotation by the hand and fingers of the person using them.

In an embodiment of the invention, a cross-sectional dimension of the tool insertion cavity is between 4 mm and 20 mm, preferably between 6 mm and 15 mm, most preferably between 9 mm and 11 mm.

In an embodiment of the invention, an outer cross-sectional dimension of the adaptor head is between 10 mm and 26 mm, preferably between 12 mm and 21 mm, most preferably between 15 mm and 17 mm.

Choosing the cross-sectional dimensions of the tool insertion cavity and the adaptor head within the specified ranges will ensure that the power tool adaptor covers all relevant tool sizes and that the material thickness is sufficient to make the power tool adaptor stable and durable.

In an embodiment of the invention, the tool bit insertion cavity is shaped to be capable of rotationally locking a tool bit inserted therein to the power tool adaptor with the longitudinal center axis of the tool bit coinciding with the longitudinal center axis of the power tool adaptor.

In case the tool held by the power tool adaptor is a reversible tool bit holder holding a tool bit at both ends, this ensures a very stable rotational locking of the reversible tool bit holder to the power tool adaptor, as the tool bit is rotationally locked to the reversible tool bit holder as well as to the power tool adaptor. Therefore, the means for releasably fixating the reversible tool bit holder inserted in the tool insertion cavity can be relatively simple as it needs only fixate the reversible tool bit holder in the longitudinal direction of the power tool adaptor.

In an embodiment of the invention, the means for releasably fixating the tool inserted in the tool insertion cavity comprises one or more tool fixation elements, each being positionable in at least two different positions, a first position of which causes the tool fixation element to protrude into a fixation recess on the surface of the tool inserted in the tool insertion cavity, and a second of which causes the tool fixation element not to protrude into such a recess.

Using one or more elements, which can be moved forth and back between a protruding "lock" position and a retracted "open" position, is a simple and reliable way of configuring releasable fixation means.

In an embodiment of the invention, at least one of the tool fixation elements is a spring-loaded ball or a spring-loaded pin.

Spring-loaded balls and pins are well-proven and reliable fixation elements suitable for being used in releasable fixation means.

In an embodiment of the invention, the position of at least one of the tool fixation elements is controlled by means of a slidable adaptor sleeve comprising one or more fixation element recesses in such a way that, when the tool fixation element is aligned with a fixation element recess, it is allowed to be in the second position, whereas, when the tool fixation element is not aligned with a fixation element recess, the tool fixation element is kept in the first position, thus fixating the tool at least in the longitudinal direction thereof.

The use of a slidable sleeve with one or more recesses is a well-proven and reliable method for controlling the positions of one or more fixation elements used in releasable fixation means.

In an embodiment of the invention, the power tool adaptor further comprises means for releasably fixating a tool bit inserted in the tool bit insertion cavity at least in a longitudinal direction of the tool bit.

In case a single tool bit is inserted in the tool bit insertion cavity for being used with the power tool adaptor, fixation means may be needed for keeping the tool bit in place in the tool bit insertion cavity.

In an embodiment of the invention, the means for releasably fixating a tool bit inserted in the tool bit insertion cavity comprises a permanent magnet arranged at the closed end of a tool bit insertion cavity.

The use of a permanent magnet is a well-proven and reliable method for fixating and at the same time magnetizing a tool bit in the longitudinal direction of a cavity into which it has been inserted.

In an embodiment of the invention, the means for releasably fixating a tool bit inserted in the tool bit insertion cavity comprises one or more tool bit fixation elements, each being positionable in at least two different positions, a first position of which causes the tool bit fixation element to protrude into a tool bit fixation recess of a tool bit, and a second of which causes the tool bit fixation element not to protrude into such a recess.

As already mentions above, using one or more elements, which can be moved forth and back between a protruding "lock" position and a retracted "open" position, is a simple and reliable way of configuring releasable fixation means.

In an embodiment of the invention, at least one of the tool bit fixation elements is a spring-loaded ball or a spring-loaded pin.

As also mentioned above, spring-loaded balls and pins are well-proven and reliable fixation elements suitable for being used in releasable fixation means.

In an embodiment of the invention, the position of at least one of the tool bit fixation elements is controlled by means of a slidable adaptor sleeve comprising one or more fixation element recesses in such a way that, when the tool bit fixation element is aligned with a fixation element recess, it is allowed to be in the second position, whereas, when the tool bit fixation element is not aligned with a fixation element recess, the tool bit fixation element is kept in the first position, thus fixating the tool bit at least in the longitudinal direction thereof.

Furthermore, it is also mentioned above that the use of a slidable sleeve with one or more recesses is a well-proven and reliable method for controlling the positions of one or more fixation elements used in releasable fixation means.

In an embodiment of the invention, a common slidable adaptor sleeve is used for controlling the positions of tool bit fixation element(s) as well as tool fixation element(s).

For simplicity and space-saving reasons it is advantageous to use one common slidable sleeve for controlling the fixation elements of the means for fixating a tool inserted in the tool insertion cavity as well as the fixation elements of the means for fixating a tool bit inserted in the tool bit insertion cavity.

In an embodiment of the invention, the means for attaching the power tool adaptor to a power tool comprises a first attachment part arranged at a second end of the adaptor body and having cross-sectional shape and dimensions suitable for being mounted in a common drill chuck.

An attachment part with such configuration allows for using the power tool adaptor with a common drilling machine.

In an embodiment of the invention, a cross-section of the first attachment part has a hexagonal shape.

The use of a hexagonal shape enables for a very strong rotational locking of the first attachment part to a drill chuck into which it is mounted.

In an embodiment of the invention, the first attachment part has a cross-sectional dimension of between 8 mm and 15 mm, preferably between 10 mm and 14 mm, most preferred about 13 mm.

Choosing the cross-sectional dimensions of the first attachment part to fall within the specified ranges ensures that the first attachment part will fit perfectly into most common drill chucks available on the market.

In an embodiment of the invention, the power tool adaptor comprises a second attachment part having cross-sectional shape and dimensions suitable for being mounted in a common quick-release lock of a power drill tool.

Such a second attachment part may be needed if the power tool adaptor is to be mounted in a quick-release lock of a power drill tool, the dimension of which is typically smaller than the dimensions of a common drill chuck.

In an embodiment of the invention, a cross-section of the second attachment part has a hexagonal shape.

The use of a hexagonal shape enables for a very strong rotational locking of the second attachment part to a quick-release lock into which it is mounted.

In an embodiment of the invention, the second attachment part has a cross-sectional dimension of between 5 mm and 7 mm.

Choosing the cross-sectional dimensions of the second attachment part to fall within the specified range ensures that the second attachment part will fit perfectly into most quick-release locks available on the market.

In an embodiment of the invention, the second attachment part further comprises one or more attachment part fixation recesses by means of which the second attachment part may be fixated at least in the longitudinal direction when inserted in a quick-release lock.

Providing the second attachment part with one or more fixation recesses, similar to the ones typically found on longer tool bits, enables the second attachment part to be locked in its longitudinal direction to a quick-release lock into which it is mounted.

In an aspect of the invention, it relates to a reversible tool bit holder for being held by a power tool adaptor as described above, said reversible tool bit holder comprising an elongated bit holder body, an elongated tool bit insertion cavity formed in each of the two ends of the bit holder body, each of which tool bit insertion cavities is capable of rotationally locking a tool bit inserted therein to the bit holder body with the longitudinal center axis of the tool bit coinciding with the longitudinal center axis of the bit holder body, and means for fixating a tool bit in each of the tool bit insertion cavities, wherein the bit holder body further comprises one or more bit holder fixation recesses formed in the outer surface of the bit holder body for being used to fixate the reversible tool bit holder in a power tool adaptor.

This configuration of the reversible tool bit holder is very simple and reliable, and the fixation recesses allows it to be easily mounted to and released from a power tool adaptor as described above by simple pushing it into and pulling it out of the tool insertion cavity thereof, respectively.

In an embodiment of the invention, the bit holder body is cylindrical.

A cylindrical bit holder body allows the reversible tool bit holder to be steadily supported and controlled during rotation by the hand and fingers of the person using it.

In an embodiment of the invention, an outer cross-sectional dimension of the bit holder body is between 4 mm and 20 mm, preferably between 6 mm and 15 mm, most preferably between 9 mm and 11 mm.

Choosing the outer cross-sectional dimensions of the bit holder body within the specified ranges will ensure that the reversible tool bit holder is able to hold any known sizes of tool bits and that the material thickness is sufficient to make the tool bit holder stable and durable.

In an embodiment of the invention, the cross-sectional shape of the tool bit insertion cavities is hexagonal.

Hexagonal cross-sectional shapes of the tool bit insertion cavities ensure the best possible fit and, thus, an optimal rotational locking of the inserted tool bits to the reversible tool bit holder.

In an embodiment of the invention, the means for fixating a tool bit comprises a permanent magnet arranged at the closed end of a tool bit insertion cavity.

In an embodiment of the invention, the means for fixating a tool bit comprises a locking ring arranged in a tool bit insertion cavity to interact with a fixation recess, such as a groove, in a tool bit.

The use of a permanent magnet and the use of a locking ring interacting with a fixation recess in a tool bit are both well-proven and reliable methods for fixating a tool bit in the longitudinal direction of a cavity into which it has been inserted.

In an embodiment of the invention, the reversible tool bit holder is provided with a slidable dividing wall between the closed ends of the two tool bit insertion cavities allowing a tool bit inserted in one tool bit insertion cavity to be inserted deeper into the reversible tool bit holder, while forcing a larger part of a tool bit inserted in the other tool bit insertion cavity to protrude from the reversible tool bit holder.

This embodiment allows tool bits, which would otherwise protrude to much from the bit holder body to allow the reversible tool bit holder to be inserted into a power tool adaptor as described above, to move further into the bit holder body than would be possible with a fixed dividing wall.

In an embodiment of the invention, the one or more bit holder fixation recesses comprise one or more substantially circular depressions in the outer surface of the bit holder body.

Circular depressions constitute a simple and very easily made form of fixation recesses.

In an aspect of the invention, it relates to a kit comprising a power tool adaptor as described above and a reversible tool bit holder as described above, wherein the bit holder body of the reversible tool bit holder is adapted to fit into the tool insertion cavity of the power tool adaptor.

A power tool adaptor and a reversible tool bit holder, which are adapted to fit each other, form together a very helpful, easily used and reliable tool set, which over a period can save the person using it a substantial amount of time that would otherwise have been used for locating, mounting and dismounting of tool bits.

BRIEF DESCRIPTION OF THE FIGURES

A few exemplary embodiments of the invention will be described in the following with reference to the figures, of which

DETAILED DESCRIPTION OF THE INVENTION

Figure 1A:
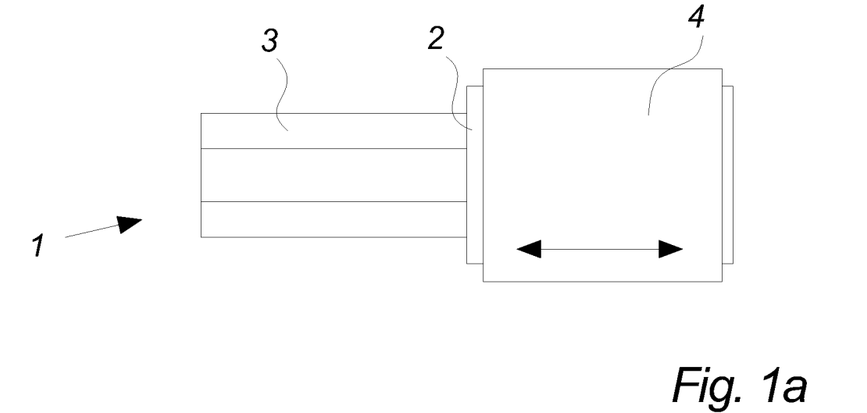
FIG. 1a is a schematic view of a power tool adaptor according to an embodiment of the invention.
Figure 1B:
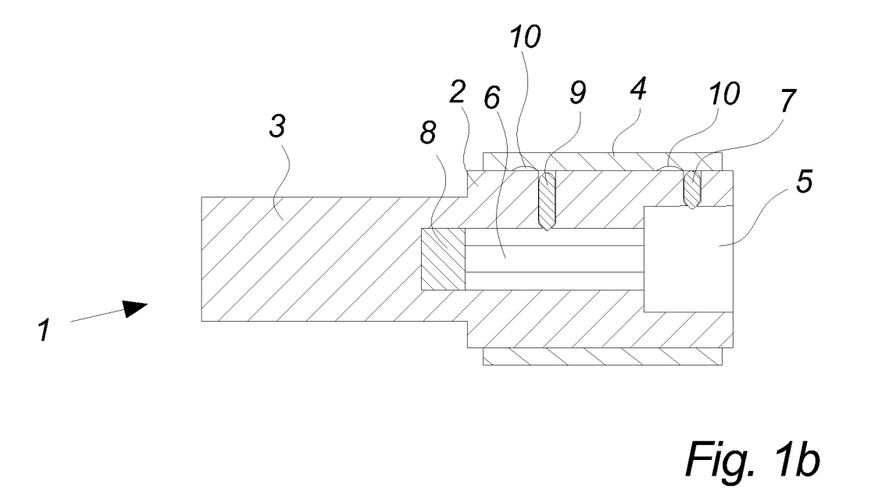
FIG. 1b is a cross-sectional view of the power tool adaptor illustrated in FIG. 1a, FIG. 2a is a schematic view of a power tool adaptor according to another embodiment of the invention.

FIGS. 1a and 1b show a schematic view and a cross-sectional view, respectively, of a power tool adaptor 1 according to an embodiment of the invention. As seen from the outside, the illustrated power tool adaptor 1 comprises an adaptor body 2, which is encircled by a slidable adaptor sleeve 4 and connected at one of its end to a first attachment part 3.

The dimensions of the power tool adaptor 1 may vary. However, in a preferred embodiment, the adaptor body 2 is cylindrical in shape with a diameter of about 16 mm and a length of about 20-25 mm, and the first attachment part 3 is hexagonal in cross-section with a shortest cross-sectional dimension of about 13 mm and a length of about 25 mm. Such shapes and dimensions ensure that the first attachment part 3 fits perfectly into a common 13 mm drill chuck, that the power tool adaptor 1 can be mounted in such a drill chuck with only the adaptor head 2 sticking out and that the adaptor head 2 does not consume any more space than necessary for fulfilling its purpose.

Into the end of the power tool adaptor 2 opposite the first attachment part 3 is formed a tool insertion cavity 5 for receiving a tool to be held by the power tool adaptor 2.

Because most rotating tools to be used with a power tool have cylindrical bodies so that they can be steadily supported and controlled during rotation by the hand and fingers of the person using them, the tool insertion cavity 5 is also typically cylindrical. In a preferred embodiment, the diameter of the tool insertion cavity 5 is about 10 mm, and the depth is 8-10 mm.

In continuation of the tool insertion cavity 5 is formed a tool bit insertion cavity 6 extending from the closed end of the tool insertion cavity 5 towards the first attachment part 3 and possibly into the interior thereof. In this way, it is possible to make the length of the adaptor body 2 shorter than the accumulated length of the tool insertion cavity 5 and the tool bit insertion cavity 6.

In preferred embodiments, the tool bit insertion cavity 6 is hexagonal in cross-sectional shape and dimensioned to make a perfect fit for the most common tool bits (see FIGS. 4b and 5b), i.e. with a shortest cross-sectional dimension of about 6 mm. The length of the tool bit insertion cavity 6 must be sufficient to receive a tool bit, which is mounted in the end of a reversible tool bit holder (see FIG. 4b), which is inserted into the tool insertion cavity 5. Typically a length of the tool bit insertion cavity 6 of about 17-20 mm will suffice. Normally, the tool bit will protrude about 15 mm from the reversible tool bit holder, and the tool bit should not be in contact with a magnet 8 arranged at the bottom of the tool bit insertion cavity 6 so that the tool bit is not pulled out of the reversible tool bit holder, when the reversible tool bit holder is removed from the power tool adaptor 1.

The perfect fit between the tool bit and the tool bit insertion cavity 6 will ensure that a reversible tool bit holder mounted in the tool insertion cavity 5 will be rotationally locked to the power tool adaptor 1 by means of the tool bit.

In the illustrated embodiment, the tool bit insertion cavity 6 is hexagonal in cross-sectional shape along its full length. However, if the power tool adaptor 1 is only to be used with reversible tool bit holders, it will typically be sufficient if the outer 10 mm or so of the tool bit insertion cavity 6 is hexagonal and fits the tool bit. In that case, the inner part of the tool bit insertion cavity 6 may comprise a cylindrical bore with a diameter of about 6 mm for receiving a tip of a tool bit inserted therein with the tip pointing into the tool bit insertion cavity 6.

Figure 5A:
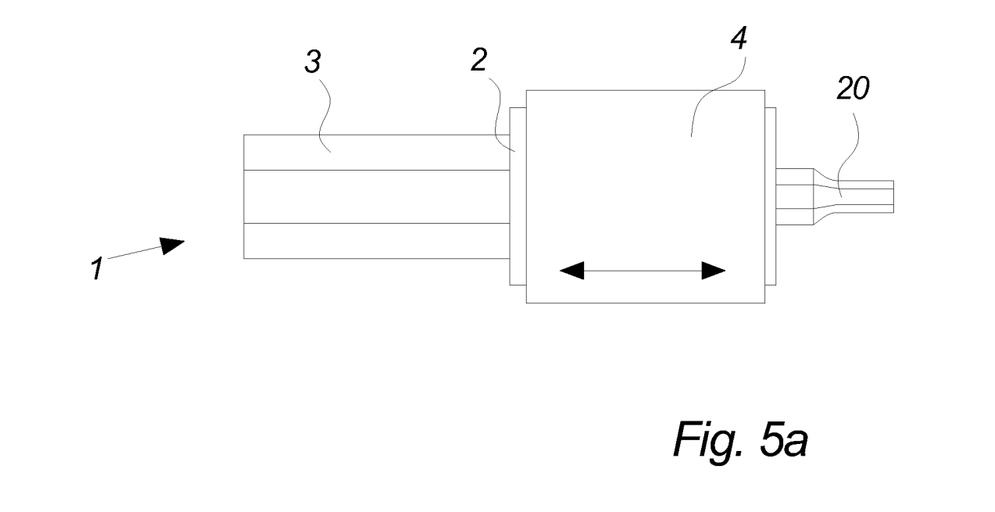
Figure 5B:
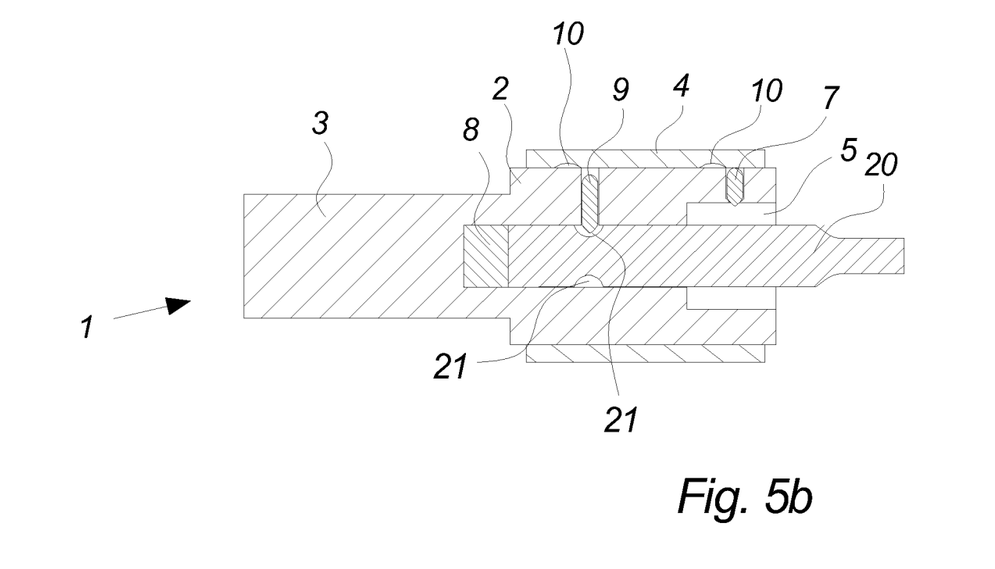
FIG. 5b is a cross-sectional view of the power tool adaptor illustrated in FIG. 5a, holding a tool bit.

As shown in FIG. 1b, a permanent magnet 8 may be arranged at the closed end of the tool bit insertion cavity 6 for fixating and magnetizing a tool bit inserted therein (see also FIG. 5b).

FIG. 1b also shows how a tool fixation pin 7 may be arranged for fixating any tool inserted into the tool insertion cavity 5. The cylindrical bore in which the tool fixation pin 7 is placed it tapered at the end opening into the tool insertion cavity 5 so that the tool fixation pin 7 cannot fall out. However, when the tool fixation pin 7 is in the illustrated position, it protrudes enough into the tool insertion cavity 5 to interact with a recess on the surface of a tool inserted therein for fixating the tool in the tool insertion cavity 5, at least in the longitudinal direction of the power tool adaptor 1.

When the slidable adaptor sleeve 4 is in the position illustrated in FIG. 1b, it forces the tool fixation pin 7 to be in the "locking" position in which it protrudes into the tool insertion cavity 5. If, however, the adaptor sleeve 4 is slid a bit towards the opening of the tool insertion cavity 5, a fixation element recess 10 on the inner side of the adaptor sleeve 4 allows the tool fixation pin 7 to be displaced a bit so that it does not any more protrude into the tool insertion cavity 5, and a tool inserted therein is no longer locked by the tool fixation pin 7 and can be retracted therefrom. The adaptor sleeve 4 is spring loaded (not shown) so that the position illustrated in the figure is the default position to which the adaptor sleeve 4 returns when not actively slid to release the tool fixation pin 7 from its "locking" position.

There may be any number of tool fixation pins 7 uniformly distributed around the adaptor head 4. For direction stability, however, the use of at least three tool fixation pins 7 is preferred.

In a similar manner, one or more tool bit fixation pins 9 are arranged to be able to protrude into the tool bit insertion cavity 6 for fixating in the longitudinal direction a tool bit inserted therein (see FIG. 5b). Normally, one or two tool bit fixation pins 9 will be sufficient to keep the tool bit firmly in position.

In the illustrated embodiment, a common adaptor sleeve 4 is used for locking and releasing the tool fixation pins 7 and the tool bit fixation pins 9, but the two fixation systems could also be controlled by means of two separate adaptor sleeves, respectively.

In other embodiments of the invention, the tool fixation pins 7 and/or the tool bit fixation pins 9 may be replaced by fixation balls or combinations of two or more fixation balls with distance pieces there between, and/or the adaptor sleeve 4 may be replaced by a number of springs arranged to spring-load the pins or balls into the "locking" position.

Figure 2A:
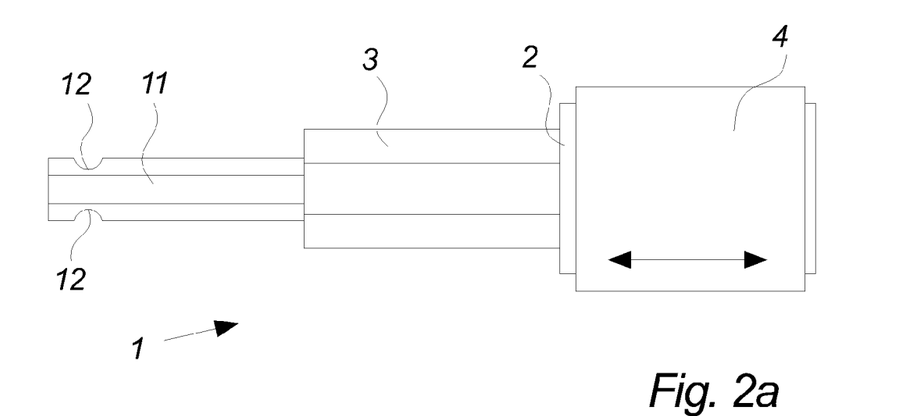
Figure 2B:
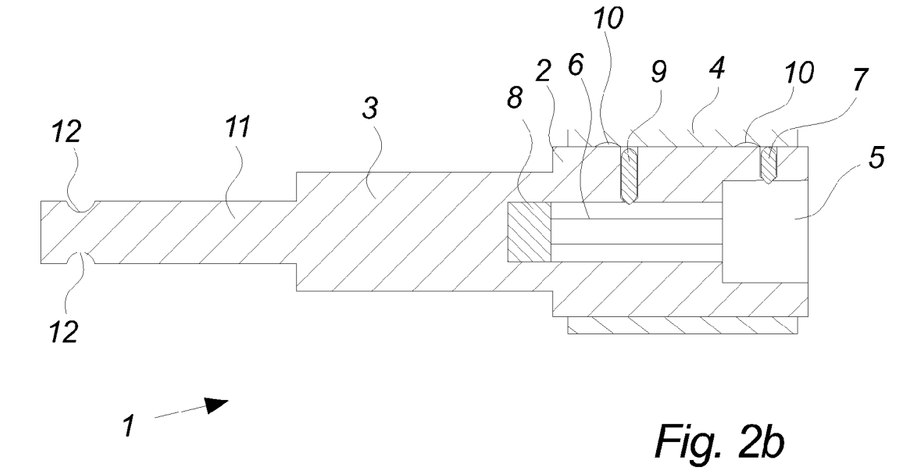
FIG. 2b is a cross-sectional view of the power tool adaptor illustrated in FIG. 2a, FIG. 3a is a schematic view of a reversible tool bit holder according to an embodiment of the invention.

FIGS. 2a and 2b show a schematic view and a cross-sectional view, respectively, of a power tool adaptor 1 according to an embodiment similar to the one illustrated in the previous figures.

The only difference is that the power adaptor tool 1 illustrated in FIGS. 2a and 2b further comprises a second attachment part 11, which is arranged as a continuation of the first attachment part 3. Like the first attachment part 3, the second attachment part 11 is typically hexagonal in cross-section. However, its cross-sectional dimensions are smaller, preferably matching those of common tool bits, i.e. with a shortest cross-sectional diameter of about 6 mm. This allows the second attachment part 11 to fit into common quick-release locks, which are often mounted on power drill tools and into which the first attachment part 3 of the power tool adaptor 1 is too large to be inserted. The length of the second attachment part 11 may vary. However, a length of about 25 mm is normally needed to ensure a secure attachment in a common quick-release lock.

Preferably, the second attachment part 11 is provided with one or more attachment part fixation recesses 12, for instance in the form of an encircling groove similar to the one found on many longer tool bits, for fixation of the second attachment part 11 in the longitudinal direction thereof.

Figure 3A:
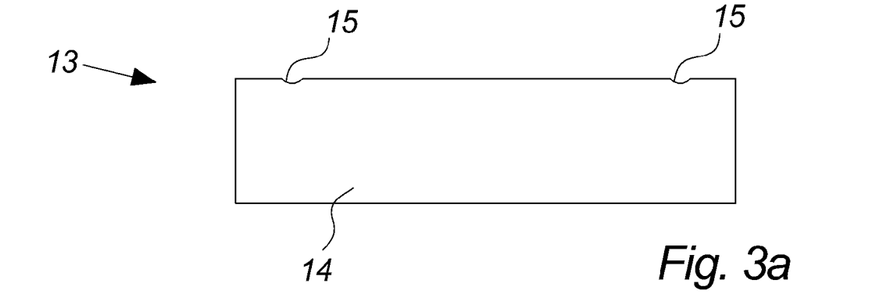

FIG. 3a is a schematic view of a reversible tool bit holder 13, which fit into the power tool adaptors 1 illustrated in the previous figures.

The reversible tool bit holder 13 comprises a cylindrical bit holder body 14 having a length, in a preferred embodiment, of about 40 mm. It comprises near to each of its ends one or more bit holder fixation recesses 15, which are adapted to interact with the tool fixation elements(s) of the power tool adaptor 1 for fixating the reversible tool bit holder 13 when it has been inserted into the tool insertion cavity 5 of the power tool adaptor 1.

The bit holder fixation recesses 15 may be of different shape. For instance, they may comprise grooves encircling the bit holder body 14. In preferred embodiments, however, the bit holder fixation recesses 15 are constituted by a number of substantially circular depressions, each adapted to receive a protruding end of a tool fixation element 7 of a power tool adaptor 1 as illustrated in FIGS. 1b an 2b. The number of such circular depressions near each end of the bit holder body 14 may vary. In preferred embodiments, however, six circular bit holder fixation recesses 15 are distributed uniformly around the bit holder body 14 near each of its two ends. In this way, it can be made sure that there will be a bit holder fixation recess 15 aligned with each of the tool bit fixation elements 7 of the power tool adaptor 1, no matter how the reversible tool bit holder 13 is rotated, as long as a tool bit inserted therein fits into the tool bit insertion cavity 6 of the power tool adaptor 1.

Figure 3B:
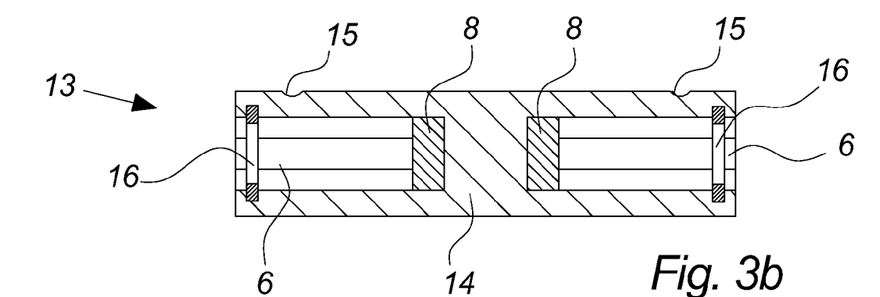
FIG. 3b is a cross-sectional view of a reversible tool bit holder according to an embodiment of the invention.
Figure 3C:
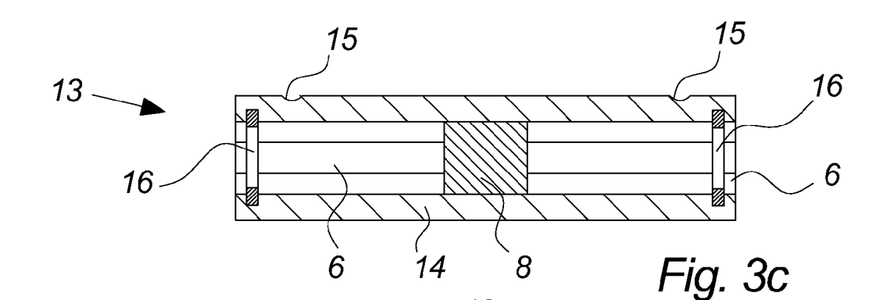
FIG. 3c is a cross-sectional view of a reversible tool bit holder according to another embodiment of the invention.
Figure 3D:
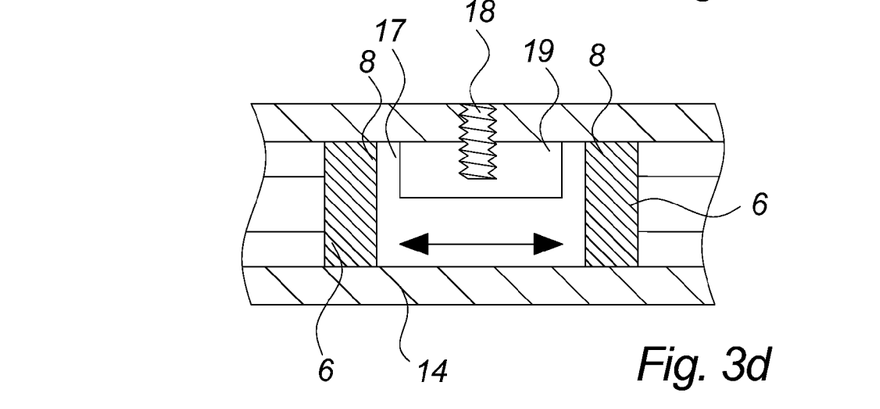
FIG. 3d is a cross-sectional view of a part of a reversible tool bit holder according to yet another embodiment of the invention.

FIGS. 3b-3d show schematically cross-sectional views of reversible tool bit holders 13 according to three different embodiments of the invention.

In the embodiment shown in FIG. 3b, a tool bit insertion cavity 6 similar to the one of the power tool adaptor 1, as illustrated in FIGS. 1b and 2b, is formed from each end of the bit holder body 14, and a permanent magnet 8 is arranged at the closed end of each of the tool bit insertion cavities 6 for fixating and magnetizing tool bits inserted therein and at the same time allowing an easy change of tool bits if required.

Furthermore, a locking ring 16 is arranged near the open end of each of the tool bit insertion cavities 6, also for fixating tool bits inserted therein. In other embodiments, the magnet 8 or the locking ring 16 may be omitted. However, the combination of the two is preferred, because it ensures magnetization and a firm fixation of the tool bit at the same time.

The embodiment shown in FIG. 3c is similar to the one from FIG. 3b with the exception that a common permanent magnet 8 forms the closed ends of the two tool bit insertion cavities 6.

FIG. 3d, which shows only the central part of a reversible tool bit holder 13 illustrates schematically how it may be provided with a slidable dividing wall between the closed ends of the two tool bit insertion cavities 6. The slidable dividing wall comprises a dividing wall segment 17 having a permanent magnet 8 arranged on each of its two sides. A pointed screw 18 mounted through the side wall of the bit holder body 14 and protruding into a slit 19 in the dividing wall segment 17 is used to keep the slidable dividing wall in place inside the bit holder body 14.

The purpose of the slidable dividing wall is to allow tool bits, which would otherwise protrude to much from the bit holder body 14 to allow the reversible tool bit holder 13 to be inserted into a power tool adaptor 1 as described above, to move further into the bit holder body 14 than would be possible with a fixed dividing wall as in the embodiments illustrated in FIGS. 3b and 3c.

Figure 4A:
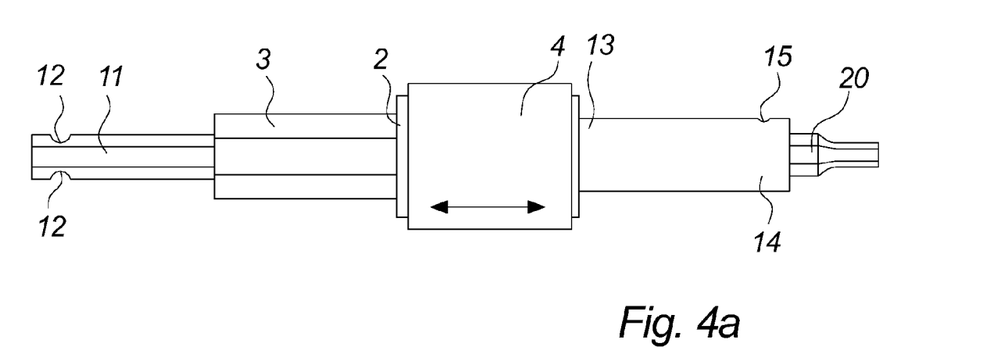
FIG. 4a is a schematic view of an interconnection of a power tool adaptor and a reversible tool bit holder according to an embodiment of the invention.
Figure 4B:
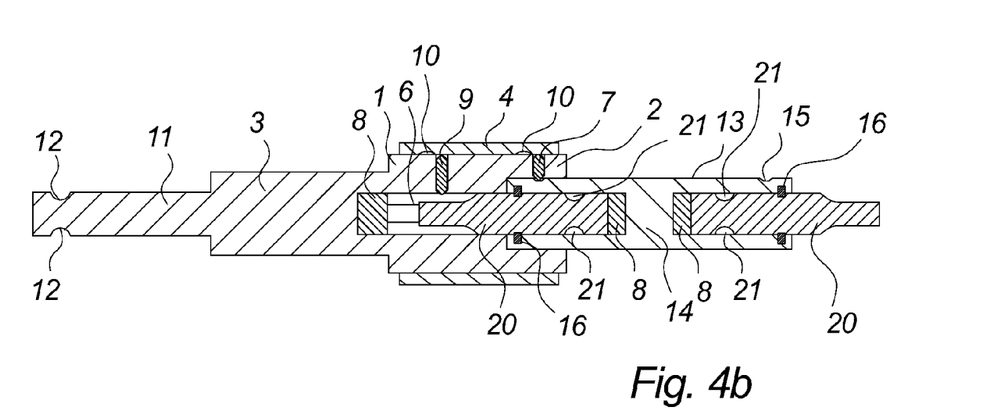
FIG. 4b is a cross-sectional view of the interconnection illustrated in FIG. 4a, FIG. 5a is a schematic view of a power tool adaptor according to an embodiment of the invention holding a tool bit.

FIGS. 4a and 4b illustrate a schematic view and a cross-sectional view, respectively, of an interconnection of a power tool adaptor 1, as shown in FIGS. 2a and 2b, and a reversible tool bit holder 13, as illustrated in FIGS. 3a and 3b.

FIGS. 5a and 5b illustrate a schematic view and a cross-sectional view, respectively, of the power tool adaptor 1, illustrated in FIGS. 1a and 1b, when used as a bit holder.

FIG. 5a illustrates how a tool bit 20, which is inserted into the tool bit insertion cavity 6 through the tool insertion cavity 5 of the power tool adaptor 1, protrudes from the adaptor body 2 through the opening of the tool insertion cavity 5.

FIG. 5b illustrates how a long tool bit 20 may be fixated in the tool bit insertion cavity 6 of the power tool adaptor 1 by means of a permanent magnet 8 arranged at the closed end of the tool bit insertion cavity 6 and one or more tool bit fixation pins 9 interacting with one or more tool bit fixation recesses 21 formed in the tool bit 20.

The invention claimed is:

1. A kit comprising:
   a power tool adaptor for holding a tool, said adaptor comprising:
      an adaptor body;
      a tool insertion cavity formed in a first end of the adaptor body for receiving the tool,
      an elongated tool bit insertion cavity formed as a continuation of the tool insertion cavity,
      means for releasably fixating the tool inserted in the tool insertion cavity at least in a longitudinal direction of the power tool adaptor, and
      means for attaching the power tool adaptor to a power tool,
      wherein the tool insertion cavity is cylindrical, and wherein the tool bit insertion cavity is hexagonal and capable of rotationally locking a tool bit inserted therein to the power tool adaptor with the longitudinal centre axis of the tool bit coinciding with the longitudinal centre axis of the power tool adaptor, wherein the hexagonal tool bit insertion cavity is disposed in continuation with the cylindrical tool insertion cavity and extends from a closed end thereof; and
   a reversible tool bit holder, comprising:
      an elongated bit holder body,
      an elongated tool bit insertion cavity formed in each of the two ends of the bit holder body, each of which tool bit insertion cavities is capable of rotationally locking a tool bit inserted therein to the bit holder body with the longitudinal centre axis of the tool bit coinciding with the longitudinal centre axis of the bit holder body, and
      means for fixating a tool bit in each of the tool bit insertion cavities,
      wherein the bit holder body further comprises
   one or more bit holder fixation recesses formed in the outer surface of the bit holder body for being used to fixate the reversible tool bit holder in a power tool adaptor
      wherein the bit holder body of the reversible tool bit holder is adapted to fit into the tool insertion cavity of the power tool adaptor, and the power tool adaptor is rotationally locked to the reversible tool bit holder by means of a tool bit inserted in the tool bit insertion cavities of the power tool adaptor and the reversible tool bit holder.

2. The kit according to claim 1, wherein a cross-sectional dimension of the tool insertion cavity is between 4 mm and 20 mm.

3. The kit according to claim 1, wherein an outer cross-sectional dimension of an adaptor head is between 10 mm and 26 mm.

4. The kit according to claim 1, wherein the means for fixating the tool inserted in the tool insertion cavity comprises one or more tool fixation elements, each being positionable in at least two different positions, a first position of which causes the tool fixation element to protrude into a fixation recess on the surface of the tool inserted in the tool insertion cavity, and a second of which causes the tool fixation element not to protrude into such a recess.

5. The kit according to claim 4, wherein at least one of the tool fixation elements is a spring-loaded ball or a spring-loaded pin.

6. The kit according to claim 4, wherein the position of at least one of the tool fixation elements is controlled by means of a slidable adaptor sleeve comprising one or more fixation element recesses in such a way that, when the tool fixation element is aligned with a fixation element recess, it is allowed to be in the second position, whereas, when the tool fixation element is not aligned with a fixation element recess, the tool fixation element is kept in the first position, thus fixating the tool at least in the longitudinal direction thereof.

7. The kit according to claim 1, further comprising means for releasably fixating a tool bit inserted in the tool bit insertion cavity at least in a longitudinal direction of the tool bit.

8. The kit according to claim 7, wherein the means for releasably fixating a tool bit inserted in the tool bit insertion cavity comprises a permanent magnet arranged at the closed end of a tool bit insertion cavity.

9. The kit according to claim 7, wherein the means for releasably fixating a tool bit inserted in the tool bit insertion cavity comprises one or more tool bit fixation elements, each being positionable in at least two different positions, a first position of which causes the tool bit fixation element to protrude into a tool bit fixation recess of a tool bit, and a second of which causes the tool bit fixation element not to protrude into such a recess.

10. The kit according to claim 9, wherein at least one of the tool bit fixation elements is a spring-loaded ball or a spring-loaded pin.

11. The kit according to claim 9, wherein the position of at least one of the tool bit fixation elements is controlled by means of a slidable adaptor sleeve comprising one or more fixation element recesses in such a way that, when the tool bit fixation element is aligned with a fixation element recess, it is allowed to be in the second position, whereas, when the tool bit fixation element is not aligned with a fixation element recess, the tool bit fixation element is kept in the first position, thus fixating the tool bit at least in the longitudinal direction thereof.

12. The kit according to claim 1, wherein the means for attaching the power tool adaptor to a power tool comprises a first attachment part arranged at a second end of the adaptor body and having cross-sectional shape and dimensions suitable for being mounted in a common drill chuck.

13. The kit according to claim 12, wherein a cross-section of the first attachment part has a hexagonal shape.

14. The kit according to claim 12, wherein the first attachment part has a cross-sectional dimension of between 8 mm and 15 mm.

15. The kit according to claim 12, further comprising a second attachment part having cross-sectional shape and dimensions suitable for being mounted in a common quick-release lock of a power drill tool.

16. The kit according to claim 15, wherein a cross-section of the second attachment part has a hexagonal shape.

17. The kit according to claim 15, wherein the second attachment part has a cross-sectional dimension of between 5 mm and 7 mm.

18. The kit according to claim 15, wherein the second attachment part further comprises one or more attachment part fixation recesses by means of which the second attachment part may be fixated at least in the longitudinal direction when inserted in a quick-release lock.

19. A reversible tool bit holder according to claim 1, wherein, each of which tool bit insertion cavities is hexagonal, and the bit holder body is cylindrical.

20. A reversible tool bit holder according to claim 19, wherein an outer cross-sectional dimension of the bit holder body is between 4 mm and 20 mm.

21. A reversible tool bit holder according to claim 19, wherein the cross-sectional shape of the tool bit insertion cavities is hexagonal.

22. A reversible tool bit holder according to claim 19, wherein the means for fixating a tool bit comprises a permanent magnet arranged at the closed end of a tool bit insertion cavity.

23. A reversible tool bit holder according to claim 19, wherein the means for fixating a tool bit comprises a locking ring arranged in a tool bit insertion cavity to interact with a fixation recess, in a tool bit.

24. A reversible tool bit holder according to claim 19, which is provided with a slidable dividing wall between the closed ends of the two tool bit insertion cavities allowing a tool bit inserted in one tool bit insertion cavity to be inserted deeper into the reversible tool bit holder, while forcing a larger part of a tool bit inserted in the other tool bit insertion cavity to protrude from the reversible tool bit holder.

25. A reversible tool bit holder according to claim 19, wherein the one or more bit holder fixation recesses comprise one or more substantially circular depressions in the outer surface of the bit holder body.

* * * * *